US011662056B2

(12) United States Patent
Trinh et al.

(10) Patent No.: US 11,662,056 B2
(45) Date of Patent: May 30, 2023

(54) TWO-AXIS DIRECT-DRIVE ROTATION MECHANISM FOR OBSERVATION DEVICE

(71) Applicant: VIETTEL GROUP, Ha Noi (VN)

(72) Inventors: Quang Trung Trinh, Ha Noi (VN); Tien Hai Tran, Hanoi (VN); Duy Nhat Tran, Vinh (VN)

(73) Assignee: VIETTEL GROUP, Ha Noi (VN)

( * ) Notice: Subject to any disclaimer, the term of this patent is extended or adjusted under 35 U.S.C. 154(b) by 82 days.

(21) Appl. No.: 17/315,757

(22) Filed: May 10, 2021

(65) Prior Publication Data

US 2021/0364123 A1    Nov. 25, 2021

(30) Foreign Application Priority Data

May 25, 2020    (VN) .............................. 1-2020-02940

(51) Int. Cl.
| | |
|---|---|
| *F16M 11/12* | (2006.01) |
| *G03B 17/56* | (2021.01) |
| *F16M 11/18* | (2006.01) |
| *H04N 23/51* | (2023.01) |

(52) U.S. Cl.
CPC .......... *F16M 11/123* (2013.01); *F16M 11/18* (2013.01); *G03B 17/561* (2013.01); *H04N 23/51* (2023.01)

(58) Field of Classification Search
CPC .... F16M 11/123; F16M 11/18; G03B 17/561; H04N 5/2252; B64D 47/08
See application file for complete search history.

(56) References Cited

U.S. PATENT DOCUMENTS

| | | | | |
|---|---|---|---|---|
| 4,217,606 A | * | 8/1980 | Nordmann | F16M 11/10 348/360 |
| 5,426,476 A | * | 6/1995 | Fussell | H04N 5/2252 348/E5.026 |
| 6,356,308 B1 | * | 3/2002 | Hovanky | F16M 11/2014 348/211.1 |
| 7,473,040 B2 | * | 1/2009 | Kenoyer | F16M 13/02 396/428 |
| 11,099,463 B2 | * | 8/2021 | Tran | G03B 15/006 |
| 11,161,630 B2 | * | 11/2021 | Welle | B64G 1/283 |
| 11,194,231 B2 | * | 12/2021 | Su | F16M 13/022 |
| 2004/0042783 A1 | * | 3/2004 | Diana | F16M 11/18 396/427 |

(Continued)

FOREIGN PATENT DOCUMENTS

| | | | | |
|---|---|---|---|---|
| EP | 3306346 A1 | * | 4/2018 | ........... B64C 39/024 |
| WO | WO-9965234 A1 | * | 12/1999 | ............. F16M 11/10 |

(Continued)

*Primary Examiner* — Eret C McNichols
(74) *Attorney, Agent, or Firm* — PatentTM.US

(57) ABSTRACT

The invention refers to the two-axis direct-drive rotation mechanism for observation device with design drive block inside assembly tilt-axes for a multi-sensor surveillance device used for unmanned vehicles. This is mechanical mechanism performs rotate pan-tilt axis by direct drive motor. This mechanism include of main components: assembly pedestal, assembly pan-axis and assembly tilt-axis. Electronic circuits, encoders, mechanism, motor are optimized arranged and scientific designed the layout space and the weight of the structure. This mechanism can integrate optical sensors such as infrared cameras, high resolution camera, laser rangefinder.

6 Claims, 5 Drawing Sheets

(56) References Cited

U.S. PATENT DOCUMENTS

| | | | | |
|---|---|---|---|---|
| 2006/0104633 A1* | 5/2006 | Kenoyer | ............... | F16M 11/18 |
| | | | | 396/428 |
| 2011/0285990 A1* | 11/2011 | Nakao | ............... | B01L 3/502715 |
| | | | | 356/246 |
| 2014/0327764 A1* | 11/2014 | Nelson | ............... | H04N 5/2252 |
| | | | | 348/373 |
| 2017/0254469 A1* | 9/2017 | Okamura | ............... | F16M 11/18 |
| 2017/0261836 A1* | 9/2017 | Wada | ............... | G03B 17/561 |
| 2017/0336018 A1* | 11/2017 | Xie | ............... | F16M 11/12 |
| 2018/0099744 A1* | 4/2018 | Böckem | ............... | G01S 7/4813 |
| 2018/0367738 A1* | 12/2018 | Fukuzawa | ............... | H04N 5/23296 |
| 2019/0098189 A1* | 3/2019 | Kimura | ............... | H04N 5/2254 |
| 2019/0163039 A1* | 5/2019 | Zhang | ............... | B64C 39/024 |
| 2020/0371310 A1* | 11/2020 | Yu | ............... | G03B 17/561 |

FOREIGN PATENT DOCUMENTS

| WO | WO-2006065892 A2 * | 6/2006 | ............ | F16M 11/12 |
|---|---|---|---|---|
| WO | WO-2016038831 A1 * | 3/2016 | ............ | G03B 11/043 |
| WO | WO-2018064831 A1 * | 4/2018 | ............ | B64C 39/024 |

* cited by examiner

TWO-AXIS DIRECT-DRIVE ROTATION MECHANISM FOR OBSERVATION DEVICE

TECHNICAL FIELD

The invention refers to a two-axis direct-drive rotation mechanism for observation device. Specifically, the rotating mechanism mentioned in the present invention has two axes with a design of tilt block inside for use with multi-sensor observation devices, which can be used for stationary, mobile or unmanned aerial vehicles.

BACKGROUND OF THE INVENTION

In the published patent documents, some works have content concerning two-axis drive mechanism for pan-axis and tilt-axis rotation equipment. However, Some shortcomings and limitations of the published inventions remain as follows:

United States Patent No. 20060071121 A1 "Gimbal system" published Apr. 6, 2006 describes the design of a multi-axis drive mechanism. The content of the invention mainly housings space-saving layout methods. Detail design of driving mechanism, the industrial design isn't mentioned in the content of the invention.

U.S. Pat. No. 8,882,369 B1 "integrated gimbal assembly" issued Oct. 11, 2014 describes the design of two-axis drive mechanism. However, the design uses a gear or belt drive system. This design focus on easily assembly; Exact factors, space-saving layout, weight optimization, industrial design aren't mentioned in the content of the invention.

To overcome the above limitations, the authors propose the two-axis direct-drive rotation mechanism for observation device having a design with tilt block inside with the addition of waterproof gaskets, dust seals, the humidity indicator, and breather valve used for observation systems on motor vehicles and unmanned aircraft, unlike any other patent ever published.

BRIEF SUMMARY OF THE INVENTION

The purpose of the present invention describes in detail the design of the two-axis direct-drive rotation mechanism for observation device. The system uses a direct drive motor and encoder to minimize the transmission error of the mechanism for the two axes, integrating electric commutator on both axes to ensure the rotation system 360*n. Furthermore, the structure is designed to place the motor and the encoder of the tilt-axis assembly inside to ensure optimal space layout of microcontroller electronic circuits, electric commutator, direct-drive motor and encoder as well as reducing the weight of the actuator of the whole unit with the addition of dynamic waterproof gaskets for the winch and humidity indicator, dust seals, bearther valves on the assembly tilt-axis to ensure protection against the environment suitable for devices inside the housing.

To achieve the above purpose, the authors propose the design of a two-axis direct-drive rotation mechanism for observation device consisting of assembly parts show in FIG. 1 and FIG. 2: Assembly structure Pan block (1); Assembly structure Tilt block (2). In addition, the detailed parts in each assembly of the two-axis direct drive mechanism are detailed in FIG. 3 and FIG. 4.

Assembly pan-axis (1) consists of: connector (3), central processing box (4), central controller electronic circuit (5), motor and slip-ring mounting bracket pan-axis (6), pan-axis direct motor (7), mounting stator of pan-axis direct motor (8), mounting rotor of pan-axis direct motor (9), pan-axis shaft (10), thin section bearing (11), inner spacing part (12), outer spacing part (13), inner grommet (14), outer grommet (15), fixing inner bearing part (16), waterproof gasket (17), pan-axis encoder (18), pan-axis turntable (19), pan-axis electronic circuit board (20), pan-axis slip-ring (21), left support arm (22), left shell (23), right support arm (24), right shell (25).

Assembly tilt-axis (2) consists of: tilt-axis direct motor (26), mounting stator of tilt-axis direct motor (27), mounting rotor of tilt-axis direct motor (28), titl-axis shaft (29), tilt-axis motor bearing (30), tilt-axis mounting slip-ring shaft (31), titl-axis slip-ring (32), dust seal (33), tilt-axis shaft frame (34), tilt-axis encoder (35), mounting encoder (36), encoder reader support hand (37), tilt-axis bearing (38), tilt-axis turntable (39), heat sink (40), tilt-axis electronic circuit board (41), optical sensors brackets (42), electronic image processing block (43), electronic block read image (44), humidity indicator (45), daylight camera (46), thermal camera (47), laser range finder (48), front housing (49), back housing (50), breather valve (51).

All sensor system, microprocessor circuit, motor, encoder and auxiliary equipment are firmly fixed and protected by metal frames.

The invention's products can be applied in scanning equipment, communications equipment, observation systems for motor vehicles and unmanned aerial vehicle.

DETAILED DESCRIPTION OF THE INVENTION

Figure 1:
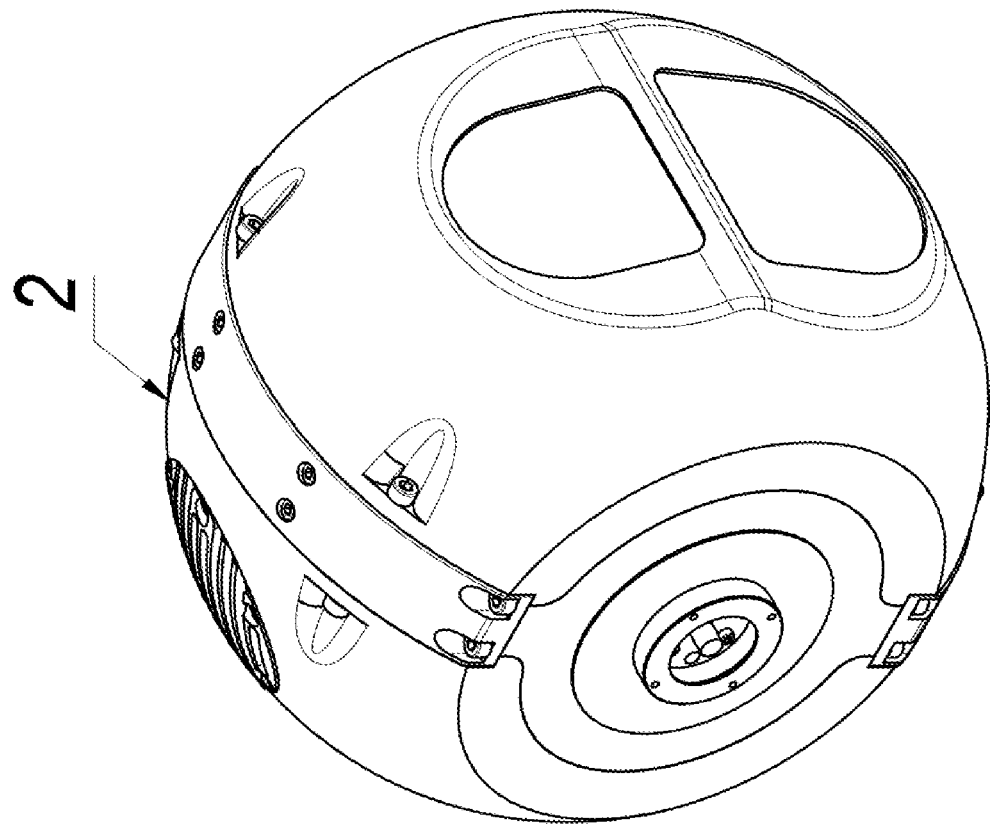
FIG. 1 Overview of the mechanical structure.
Figure 1:
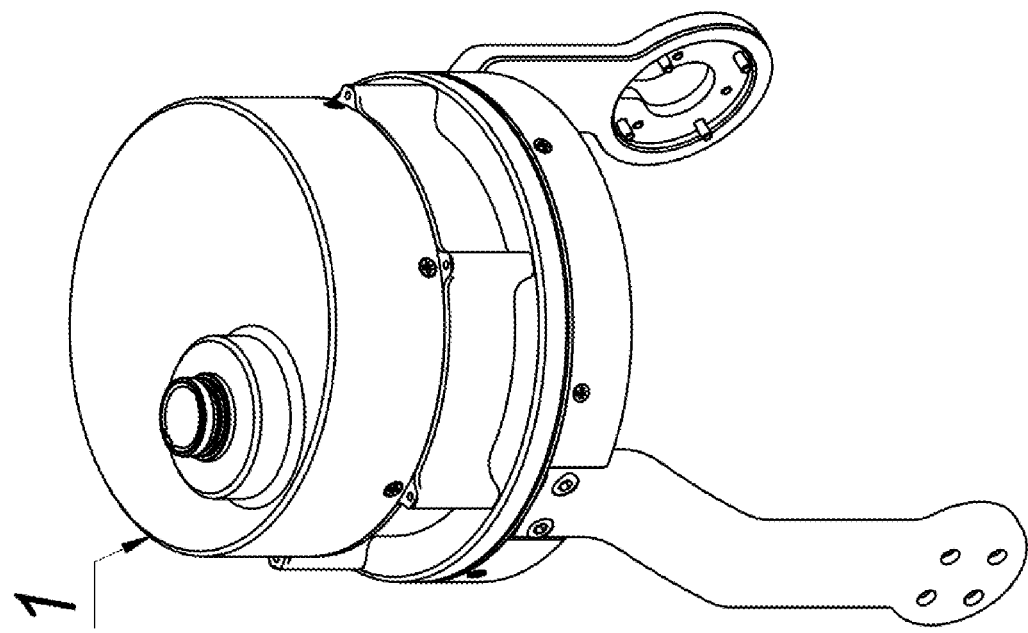
Figure 2:
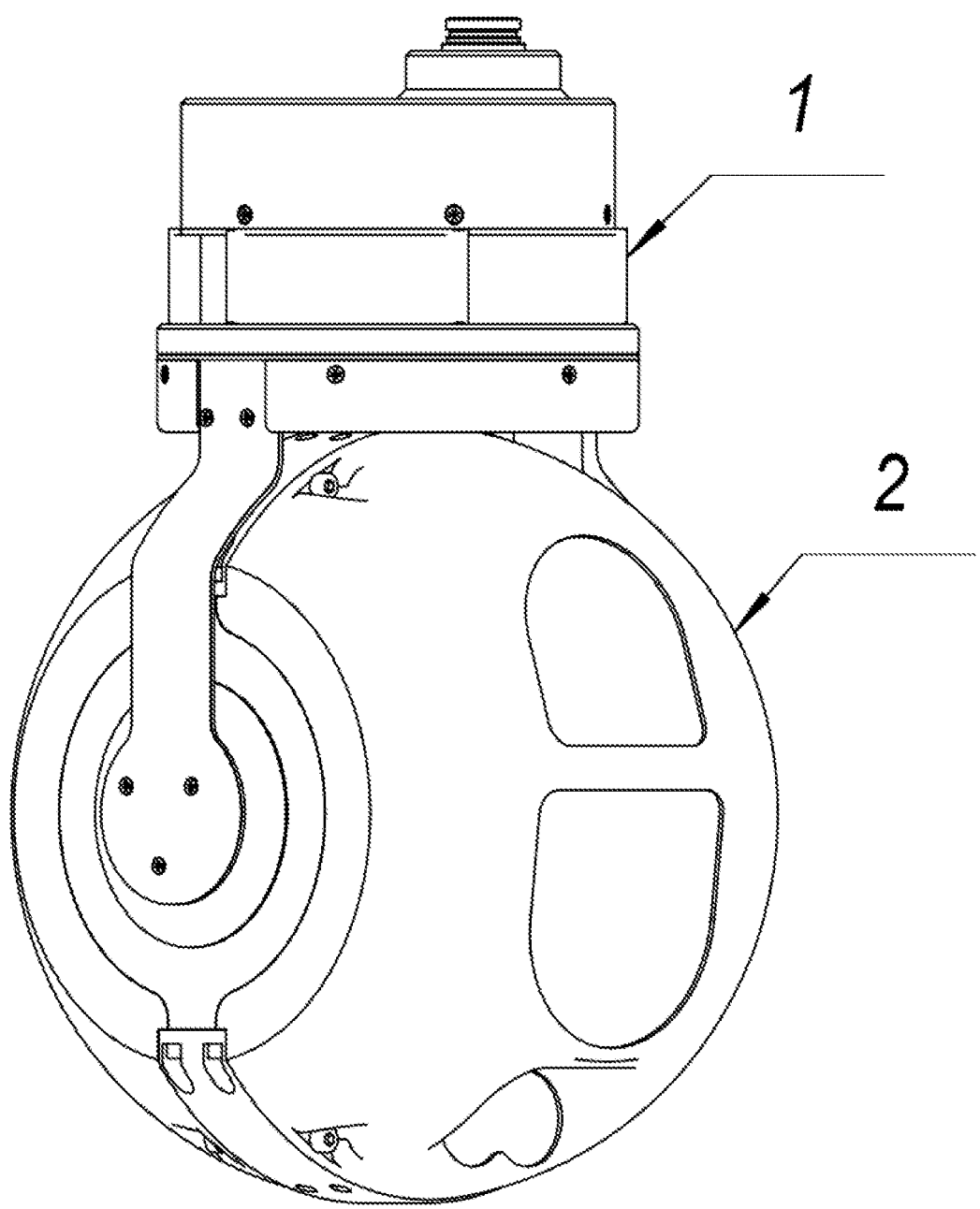
FIG. 2 Industrial design with protective housing.
Figure 4:
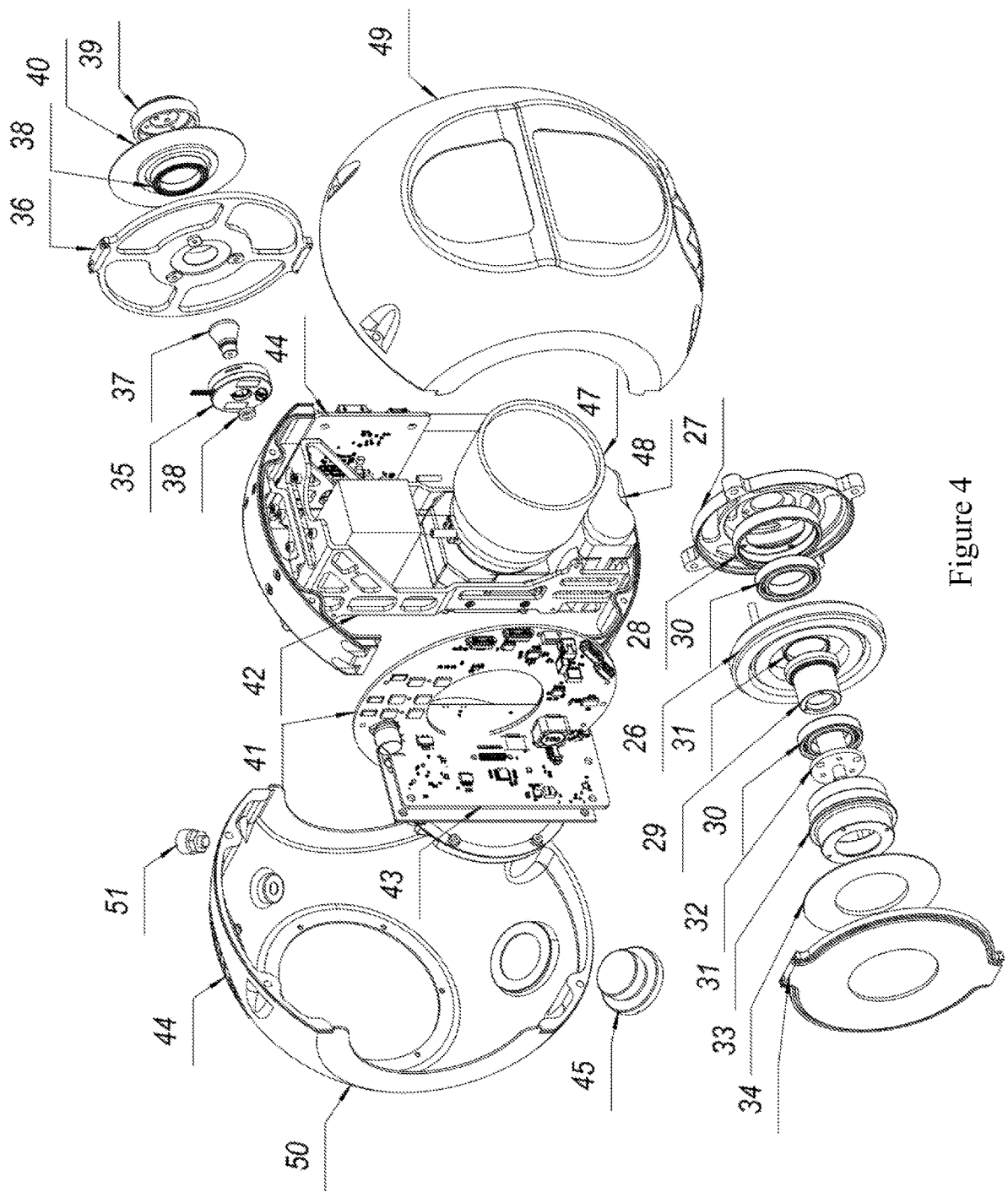
FIG. 4 Describes and detailed of structural components Tilt block.
Figure 5:
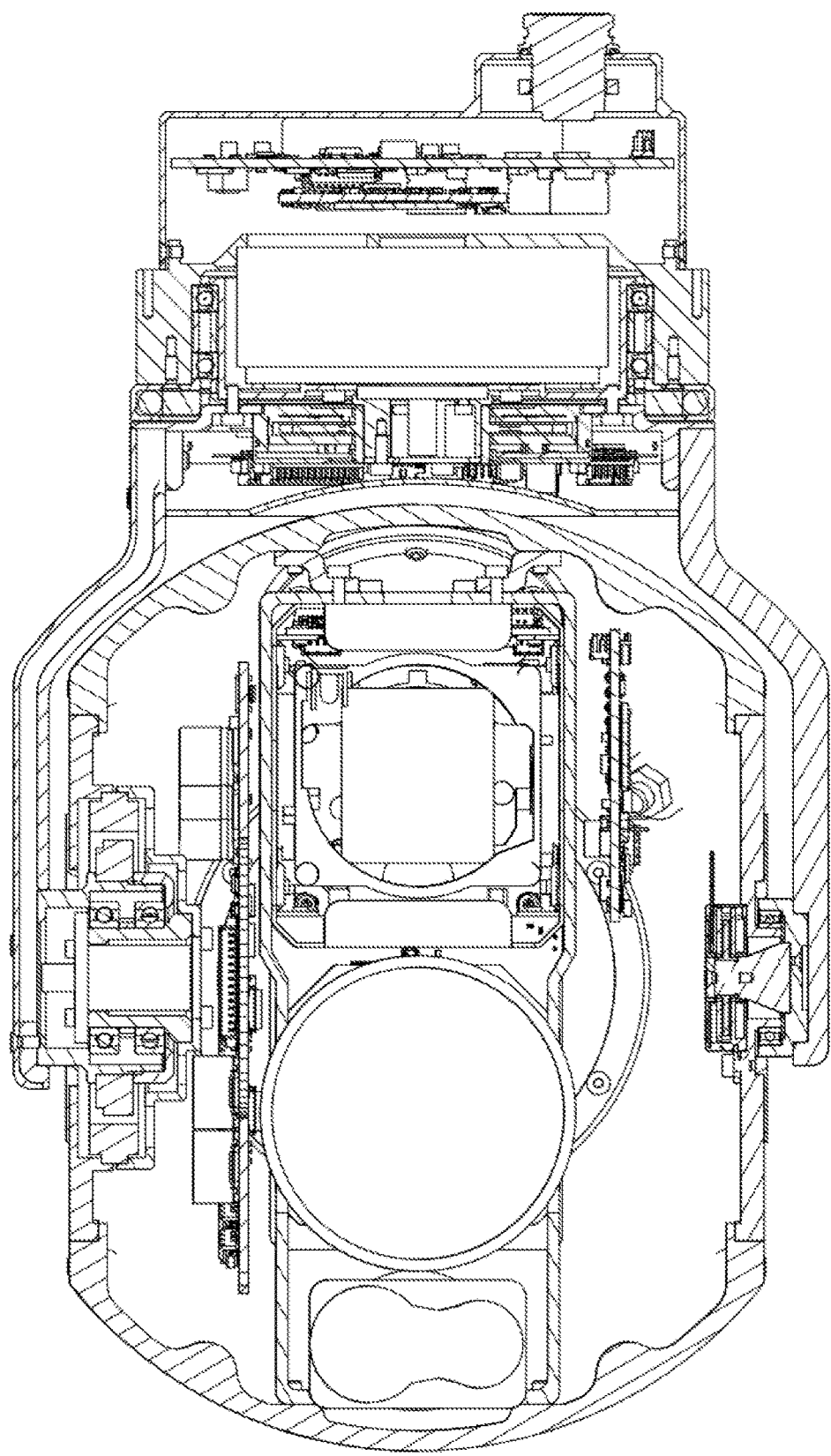
FIG. 5 Section view of two-axis direct-drive rotation mechanism.

Two-axis direct-drive rotation mechanism for observation device includes the parts shown in FIG. 1 and FIG. 2. FIG. 1 shows a general description of the mechanical structure design, FIG. 2 shows a industrial design as well as the fully design of structure with optical sensor assembly and protective housing that are completely integrated, FIG. 3 describes and details of structural components Pan block, FIG. 4 describes and detailed of structural components Tilt block, FIG. 5 Section view of two-axis direct-drive rotation mechanism.

The main equipment assemblies of the two-axis direct-drive rotation mechanism for observation device include:

Assembly pan-axis (1): consists of a mechanical part, central processing electronic circuit and Pan-axis drive mechanism; connecting the structure with a motorized device, coordinating the general operation of the structure and performing the Pan-axis rotation drive. Beside protecting the internal equipment from the environment function, the mechanical part has anti-air resistance design and is compact for easy assembly for motor vehicles or stationary use.

Figure 3:
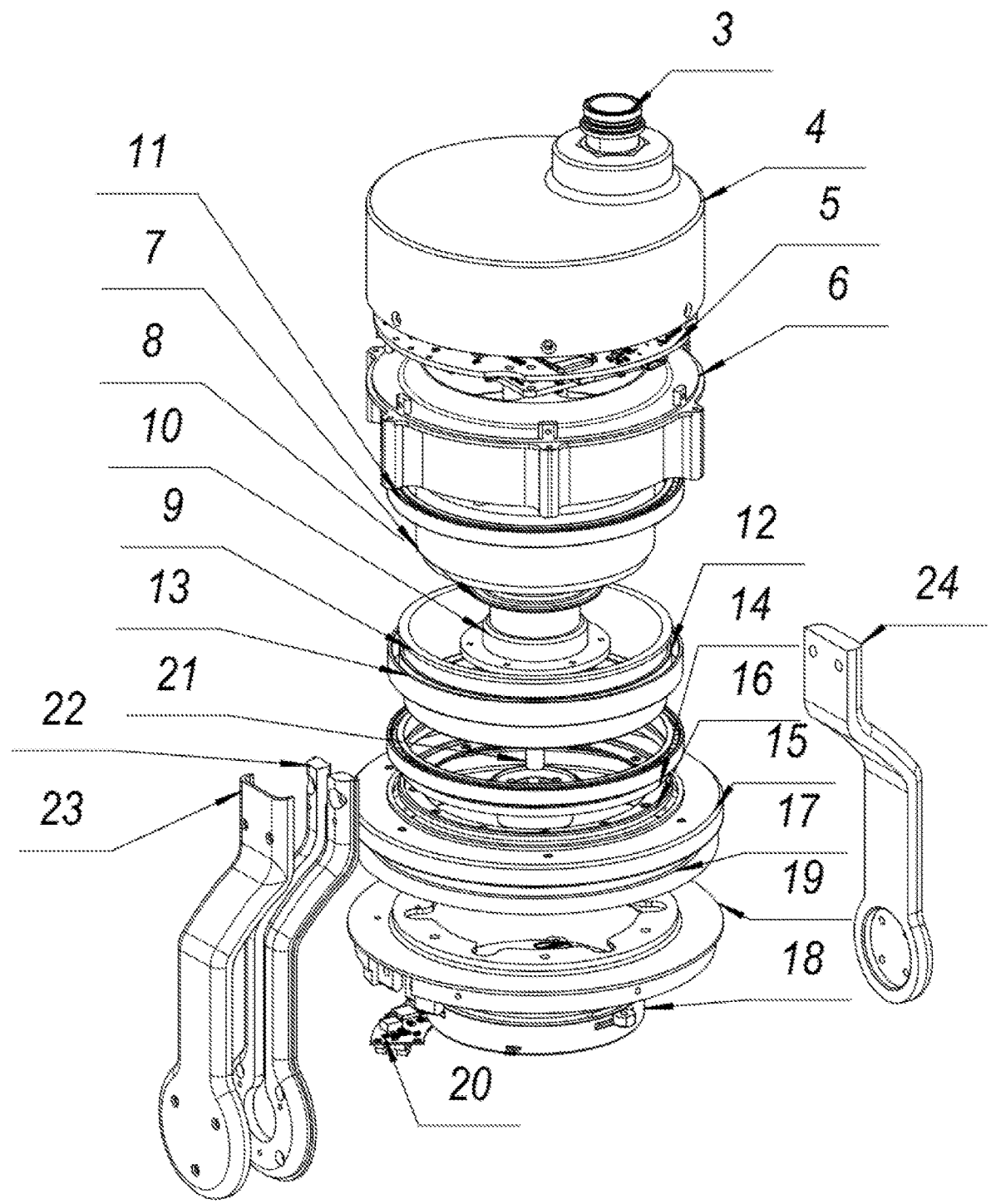
FIG. 3 Describes and detailed of structural components Pan block.

Refer to FIG. 3, details of the assembly pan-axis are as follows:

Connector (3) is an metal element, this is the focal point to ensure communication between the device and outside devices.

Central processing box (4) is a mechanical part made of metal used to protect the central controller electronic circuit (5) and attached to motor and slip-ring mounting bracket pan-axis (6);

Central controller electronic circuit (5): is a electronic circuit which coordinates the general operation of the structure, communicates with peripheral devices to receive control commands, receive data and issue warning and control signals to other components in the system.

Motor and slip-ring mounting bracket pan-axis (6) is an mechanical part made from metal used to fix the motor stator and slip-ring.

Pan-axis direct motor 7 is a direct-drive frameless motor in which the stator and rotors are clamped by mounting stator of Pan-axis direct motor (8) and mounting rotor of Pan-axis direct motor (9), made from metal.

Pan-axis shaft (10) is a precision rotating mechanical part used to transmit the shaft rotation motion from Pan-axis direct motor 7.

Thin section bearing (11) is super slim standard bearing but ensuring the load and durability. Beside reducing the friction of axial rotation function, this bearing optimizes the layout space and mass of mechanism.

Inner spacing part (12) is a rotating mechanical part used to determine the distance of the inner ring of two thin section bearings (11).

Outer spacing part (13) is a rotating mechanical part used to determine the distance of the outer ring of two thin section bearings (11).

Inner grommet (14) is a rotating mechanical part used to tighten the inner ring of two thin section bearing (11).

Outer grommet (15) is a rotating mechanical part used to tighten the outer ring of two thin section bearing (11).

Fixing inner bearing part (16) is a rotating mechanical part used to fixed, protect the thin section bearing mechanism. Especially, the fixed bearing ring is designed with waterproof gasket fitting to ensure rotation with the pan-axis turntable (19).

Waterproof gasket (17) is a special rubber detail to prevent water and dust from entering inside.

Pan-axis encoder (18) is a disk rotary encoder used to indicate the actual speed of the shaft rotation.

Pan-axis turntable (19) is a precision mechanical part made of metal used to housing the slip-ring (21), pan-axis electronic circuit board (20) and connect with pan-axis shaft (10) by bolt joints.

Pan-axis electronic circuit board (20) includes power circuit, pan and tilt motor control circuit and accelerometer sensor for power distribution, control of motor speed and collecting the angular velocity and angular position value.

Pan-axis slip-ring (21) is a rotating electrical mechanism that works similarly to the rotation of a bearing, the parts that can rotate continuously 360 degrees at a rotation speed equal to that of the motor.

Left support arm (22), right support arm (24), are the precision mechanical components made of metal to connect the pan-axis turntable (19) with assembly tilt-axis (2).

Left shell (23) and right shell (25) is a precision mechanical part made of metal to protect all the details inside support arm.

With the aim of optimizing the structure size and weight, the design authors placed the motor and encoder inside tilt block. Ensure that the tilt block is compact at most, reaching the size about Ø162×126 mm Refer to FIG. 4, details of the assembly tilt-axis are as follows:

Tilt-axis direct motor (26) is a direct-drive frameless motor.

Mounting stator of tilt-axis direct motor (27) is a mechanical part made of metal to fasten the tilt motor stator by bolt joints.

Mounting rotor of tilt-axis direct motor (28) is a mechanical part made of metal to clamp the rotors of tilt-axis direct motor.

Tilt-axis shaft (29) is a rotating mechanical part made of metal to position the tilt-axis rotation.

Tilt-axis motor bearing (30) is standard bearing to reduce friction between the Tilt-axis shaft (29) and Tilt-axis mounting slip-ring shaft (31).

Tilt-axis mounting slip-ring shaft (31) is a disk-shape mechanical part made of metal to mount the tilt-slip-ring.

Tilt-axis slip-ring (32) is a rotating electrical mechanism that works similarly to the rotation of a bearing, the parts that can rotate continuously 360 degrees at a rotation speed equal to that of the motor.

Dust seals (33) is a standard component that protects the inside components of the tilt-axis assembly from the outside environment.

Tilt-axis shaft frame (34) is a mechanical part made of metal material, used to fasten with mounting stator of tilt-axis direct motor (27) and tilt-axis encoder (35).

Tilt-axis encoder (35) is a disk rotary encoder used to indicate the actual speed of the shaft rotation.

Mounting encoder (36), encoder reader support hand (37) are mechanical parts made of aluminum material, used to fasten the tilt axis encoder.

Tilt-axis bearing (38) is a standard mechanism part reducing the friction of axial rotation.

Tilt-axis turntable (39) is a precision mechanical part made of aluminum material, used to position the tilt-axis.

Heatsink (40) is a mechanical part made of metal bars. Parts are mounted on the housing, using wind from the outside environment to reduce the temperature for image processing circuitry.

Tilt-axis electronic circuit board (41) including accelerometer, electronic circuit standardizing image signals mounted on the frame, perpendicular to Tilt-axis.

Optical sensors brackets (42) includes mechanical frames made of metal to fix the optical sensors.

Electronic image processing block (43), electronic block read image (44) including CPU (central processing unit) for image processing, electronic circuits controlling, image conversion, integrated to protective housing.

Humidity indicator (45) is a detail indicating the ambient humidity inside the tilt block.

Daylight camera (46), thermal camera (47), laser rangefinder (48) are optical sensor modules that ensure to receive signals from the environment on image processing electronic circuit blocks.

Front housing (49) and back housing (50) are mechanical parts made of hard plastic that protect the inside parts of tilt block.

Breather valve (51) is a standard component that balances pressure when the device changes the operating environment to prevent steam.

Assembly pan-axis (1) was designed by the authors group arranged according to the top order layer the driving block followed by the drive control block. Specifically, central processing box (4), central controller electronic circuit (5), motor and slip-ring mounting bracket pan-axis (6), pan-axis direct motor (7), mounting stator of pan-axis direct motor (8), mounting rotor of pan-axis direct motor (9), pan-axis shaft (10), pan-axis encoder (18), pan-axis turntable (19), pan-axis electronic circuit board (20), pan-axis slip-ring (21), all hold together by mounting joints and by bolt joints. With the arrangement of layers in the order above, the assembly pan-axis is compact in size and easy in the assembly process.

According to the implementation of the invention, at assembly tilt-axis (2) was designed with all components located inside tilt block, tilt-axis direct motor (26), tilt-axis encoder (35) with parts to ensure drive includes mounting stator of tilt-axis direct motor (27), mounting rotor of tilt-axis direct motor (28), tilt-axis shaft (29), tilt-axis motor bearing (30), tilt-axis mounting slip-ring shaft (31) tilt-axis slip-ring (32), dust seal (33), tilt-axis shaft frame (34), mounting encoder (36), encoder reader support hand (37), tilt-axis bearing (38), tilt-axis turntable (39), is fully mounted inside tilt block, electronic image processing block (43) is arranged on the heat sink to ensure that the temperature is not overloaded during the device operation. Largest space is at the center of the tilt block for optical sensor modules fixed by optical sensors brackets (42). Tilt-axis electronic circuit board (41) is designed in the ring shape that is fixed on the left side of the optical block to ensure optimal line-up from the motor to the control circuit. All components of tilt block are protected by front housing (49) and back housing (50).

Left support arm (22), right support arm (24) are parts to ensure connection of assembly pan-axis and assembly tilt axis. Left arm is notched in the middle to ensure the signal transmission space between the two drive assemblies and is protected by a shell left (23).

In the process of implementing the drive, the central controller electronic circuit communicates, controls and sends the value of rotation angle, speed of rotation angle . . . to the control circuits of pan/tilt by slip-ring. At pan/tilt controller electronic circuits, based on angular/angular velocity feedback from the sensors to calculate and give appropriate control parameters, meet the requirements from the communication and control motor by independent drive circuit. Pan-axis direct motor drives the assembly pan-axis through the pan-axis shaft, thin section bearing to reduce rotation friction. Tilt-axis direct motor drive to the assembly tilt-axis containing the optical sensors through the tilt axis encoder and the tilt-axis shaft. The two motors perform independent control depending on the control purpose of the task requiring 360° *n rotations.

The tilt-axis shaft frame are grooved to press the waterproof gasket and the two front housing parts on the back housing using specialized glue in the integration process to ensure a tight fit that meets IP54 standards.

The invention claimed is:

1. A two-axis direct-drive rotation mechanism for observation device includes an assembly pan-axis, a tilt-axis assembly, wherein
the assembly pan-axis includes:
a central processing electronic circuit that is protected by a central processing box that is mounted in a motor and a pan-axis slipring mounting bracket to locate a stator of the motor and the slip-ring, wherein the motor is a pan-axis direct-drive frameless motor, which has the stator and a rotor that are located by a mounting stator of the pan-axis direct drive frameless motor and a mounting rotor of the pan-axis direct drive frameless motor, pan-axis shaft is a precision rotating mechanical part used to transmit a shaft rotation motion from the pan-axis direct-drive frameless motor, a thin section bearing comprising a standard bearing at a fixed distance by an inner spacing part and an outer spacing part, a pan-axis turntable has a disk-shape used to house a pan-axis encoder reader and mounting, a pan-axis electronic circuit board and connect with the pan-axis shaft by bolt joints, connect with the assembly tilt-axis by two support arms, the pan-axis electronic circuit board include a power circuit, a pan motor control circuit and an accelerometer sensor for power distribution, control of motor speed and collection of an angular velocity and an angular position value, wherein the pan-axis encoder reader and mounting is a device that reads a speed parameter of an infrared encoder, which is mounted on a same plane of a shaft encoder via a mounting bracket to the pan-axis turntable,
the assembly tilt-axis include:
a tilt-axis direct motor comprising a direct-drive frameless motor in which a stator and rotors of the tilt-axis direct motor are clamped by mounting the stator of tilt-axis direct motor and mounting the rotor of the tilt-axis direct motor with a support arm for positioning a tilt-axis shaft, which contains a tilt-axis motor bearing to reduce friction and fixed inside the assembly tilt-axis, an electronic image processing block including a CPU (central processing unit) for image processing, electronic circuits controlling, image conversion, integrated to a protective housing, a heat sink is mounted on the protective housing using wind from an outside environment to reduce temperature for image processing circuit, a tilt-axis encoder is a disk rotary encoder used to indicate an actual speed of rotation of the tilt-axis shaft, which is located by an encoder shaft mounting, the tilt-axis rotation shaft is a mechanical part to transmit motion from the tilt-axis motor to optical sensors brackets, which include mechanical frames to fix at least one optical sensors, a tilt-axis electronic circuit board including an accelerometer, an electronic circuit standardizing image signals mounted on at least one of the mechanical frames, perpendicular to a tilt-axis, all components layout located inside a spaced defined by two Tilt-axis frames combined with a front part of the protective housing, a back part of the protective housing is fixed by bolt joints that completely seal the tilt-axis assembly into a rotating block.

2. The two-axis direct-drive rotation mechanism for observation device according to claim 1, mechanical parts are made of metal material.

3. The two-axis direct-drive rotation mechanism for observation device according to claim 1, the electrical circuits designed in an arc shape, arranged around and fixed on the pan-axis turntable and the optical sensors brackets at the assembly tilt-axis.

4. The two-axis direct-drive rotation mechanism for observation device according to claim 1, wherein image processing electronic circuits are arranged around the back portion of the housing, and a heatsink is mounted on the housing to reserve a largest space for an optical sensor block.

5. The two-axis direct-drive rotation mechanism for observation device according to claim 1, wherein the components of the assembly pan-axis are connected together through the pan-axis turntable and pan-axis shaft by a bolt joint, the assembly tilt-axis is connected to the assembly pan axis through two support arms.

6. The two-axis direct-drive rotation mechanism for observation device according to claim 1, wherein the tilt-axis shaft frame are grooved to press a waterproof gasket and a first and a second front housing parts on a back housing using a specialized glue to ensure a tight fit that meets IP54 standards.

* * * * *